Jan. 16, 1934.  F. A. BARNES  1,943,717
TUBE COUPLING
Filed Dec. 4, 1931

INVENTOR
Frederick A. Barnes.
BY
ATTORNEY

Patented Jan. 16, 1934

1,943,717

UNITED STATES PATENT OFFICE 1,943,717

TUBE COUPLING

Frederick A. Barnes, Cleveland Heights, Ohio, assignor to Bailey Meter Company, a corporation of Delaware Application December 4, 1931. Serial No. 578,867

1 Claim. (Cl. 285—86)

My invention relates to tube couplings and has as its primary purpose to provide an improved, durable and inexpensive coupling for comparatively thin-walled tubes of relatively small diameter, especially copper and other soft or ductile metal tubes adapted to be readily flared or flanged, and where such couplings are frequently disconnected.

Such tubing is preferably joined together or to fittings or other members without the threading of the tubing, for such threading of soft metals may materially weaken the tube at the threaded portion; threading the tubing is inconvenient and expensive; and furthermore, it is quite often difficult to form clean threads that will hold fluid pressure, and especially if the joint is opened and reconnected frequently. Furthermore, the present coupling is designed to permit convenient connection and disconnection of the tubes without objectionable malformation or injury to the coupling members, should frequent disconnection be required. The construction of the coupling itself and the steps taken to produce the same also permit rapid and cheap quantity production of such articles by automatic screw machine operation. A fluid tight joint for the tube is also effectively obtained in coupling the tube initially, as well as after repeated disconnection, and the coupling members are securely interlocked whenever tightly screwed together, so that vibration will not loosen the coupling parts or permit leakage.

I have found that the parts to be applied to a tube to form a coupling member should be of the fewest possible number; that the coupling so formed should have as its prime objects simplicity, ease of joining, strength, efficiency, and such design as to readily adapt itself to be opened and reconnected without loss or deterioration of coupling ability. It is, therefore, a primary object of my invention to provide such a tube coupling having among its attributes those mentioned.

Referring now to the accompanying drawing wherein are shown certain preferred embodiments of the invention:

Like reference characters refer to similar parts throughout the several views of the drawing.

I preferably employ my invention in the coupling of tubes of lead, copper, brass or other soft, plastic material, the coupling being especially capacitated to flare or expand, or aid in the flaring or expanding of the end portion of the tube.

Figures 5, 7:
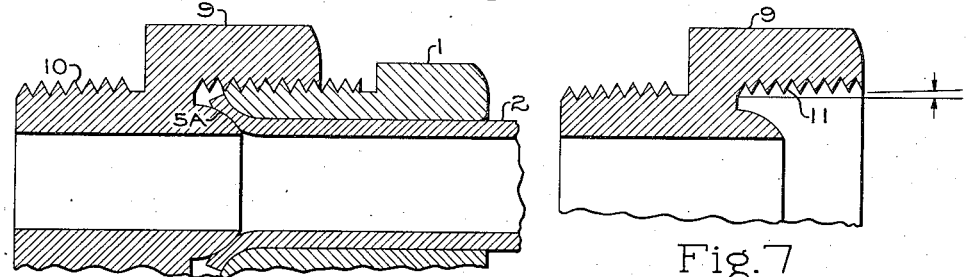
Fig. 5 is a sectional elevation of a tube and coupling member assembled for coupling a tube to a part such as a valve.
Fig. 7 is a sectional view of a fragment of Figs. 5 and 6.
Figure 6:
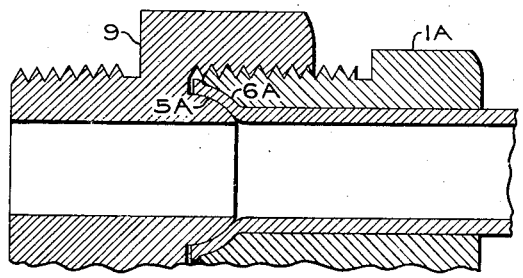
Fig. 6 is a sectional elevation similar to Fig. 5, but with a modification.

I provide for the coupling, a tube encircling nut portion 1 which should preferably snugly sleeve the tubing 2, allowing the tube to project slightly through the seating end of the nut portion over which it is slightly flared in any convenient manner before the nut portion is threaded into a body portion. The nut portion 1 is interchangeable between various couplings such, for example, as a double ended coupling illustrated in Figs. 1 and 2, wherein two pieces of tubing are coupled together; or a coupling such as is illustrated in Figs. 5, 6 and 7 having a male pipe thread 10 on one end for adaptation to other members. Likewise the coupling may be employed in connection with T's elbows, valves, or practically any member to which the tubing is desirably coupled.

Figure 1:
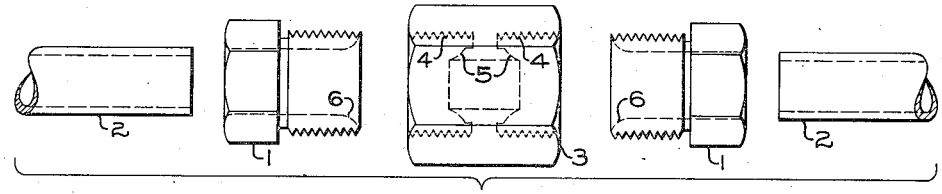
Fig. 1 is a view in side elevation showing, in unconnected relation to adjacent tubes, the several portions comprising a coupling for the tubes.
Figure 2:
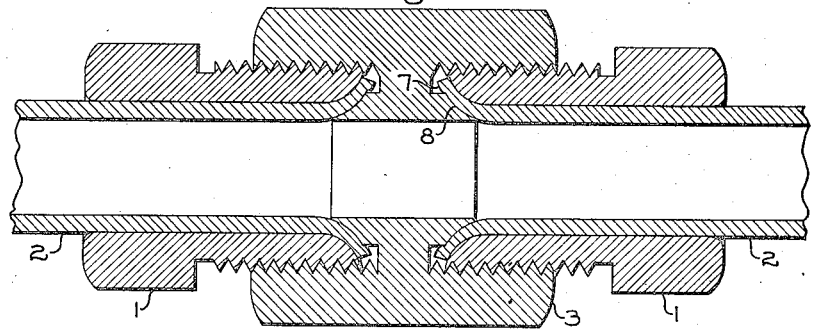
Fig. 2 is a longitudinal sectional elevation to larger scale of the tubes and parts of Fig. 1 in coupled relation.
Figures 3, 4:
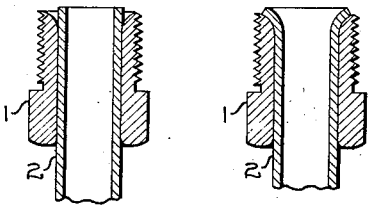
Fig. 3 is a sectional elevation of certain parts of Fig. 1 prior to flaring the tube.
Fig. 4 is similar to Fig. 3, except that herein the tube is shown as flared.

In Fig. 1 I have shown in unconnected relation the various parts comprising the madeup coupling of Fig. 2. Two tubes 2 are to be connected together or coupled in pressure-conducting relation. A nut portion 1 is provided for sleeving over the tubing 2 as illustrated in Fig. 3, whereafter the end of the tubing 2 is slightly flared over the nose or seating end of the nut portion, as in Fig. 4. A body portion 3 (Figs. 1 and 2) is provided with female threaded recesses 4 adapted to receive the nut portions 1 and having seats 5 for cooperating with the nose or seating portions of the nuts 1 to hold therebetween the flared ends of the tubes.

Convenient hex or other wrench holds are provided on each nut portion 1 and on the body portion 3 for threading the nut portions into the body portion to form a completed coupling as illustrated in Fig. 2.

Referring now in particular to Fig. 2, it will be seen that when the coupling is made up by threading the nut portions 1 into the female threaded recesses 4 of the body portion 3 and after the tubing 2 has been flared over the end of the respective nut portions as in Fig. 4, an efficient pressure tight joint is formed for coupling the tubing 2 in pressure and flow relation.

I provide for the flared end of the tube spherical or annular curved bearing surfaces which in section may comprise the arc of a circle and which differ from any now known to me for this purpose. At 6 on the nose portion I show a convex seat over which as in Fig. 4 the tubing 2 is flared at 5 in the body portion 3 I illustrate a concave seat to cooperate with the seat 6, holding therebetween the flared end of the tubing 2. The radii of the seats 5 and 6 may be the same or different, and need not be held to closely dimensioned machining, for the effect of the cooperating curved seat is as shown in Fig. 2. The seat 6 in each case being offset from alignment with the seat 5 by the thickness of the wall of the tube 2, results (in section) in a point or line contact tending to grind in or seat the curved seats relative to the flared tube in a manner such that the end of the flared tube, as at 7, remains of greater thickness than that point of the flare, for example 8, where the greatest compression between the seats occurs, and thus tends to lock the flare from being squeezed back or out from between the seats. The result is a highly efficient joint wherein the seating has been accomplished through the grinding in of spherical or curved seats and a deformation of the flare of the tubing in a manner tending to prevent the flare from squeezing out between the seating surfaces.

The type of seat which I have shown comprising, in section, curved or arcuate lines, differs radically in operation and efficiency from the older known types of beveled or tapered seats comprising, in section, straight lines either parallel or divergent. Such a curved seat turning relative to a soft or plastic material having a high coefficient of friction, conforms thereto to seat with less effort through a lesser amount of skin or surface friction, than is the case between rotated flat surfaces. The seat which I show will conform with greater efficiency to irregularities in the tubing, grinds in as is well known in spherical seats, allows the tubing flare to conform itself to the shape of the seat with far less turning effort of screwing the nut toward the body portion, and prevents any tendency toward squeezing out of the seat of the flared end of the tubing.

I show in Fig. 5 the nut portion 1 and tubing 2 as in the previously referred to illustrations, but herein a body portion 9 is illustrated, having a male pipe thread 10 for coupling the tubing 2 into a valve, tank or other part. Furthermore, the body 9 has its seat 5A convex in form rather than concave, as is the seat 5, and therein I amplify or exaggerate the squeezing or line contact between the seats on the flared end of the tubing. It will be observed that by having two convex seats, either or both of which may be turned relative to the other and relative to the flared end of the tube 2, I have two efficient spherical grinding surfaces working relative to each other on opposite sides of the flare and tending to readily and easily form an efficient seat thereon.

Again in Fig. 6 I show an arrangement similar to that previously shown, but with slight modifications; for example, the nut portion 1A has a concave seat 6A to cooperate with the convex seat 5A of the body portion 9.

I provide one of the mating threads of the coupling, preferably the female thread 11 of the body portion, (Fig. 7) with a slight taper, such, for example, as .006 inches per inch inwardly from the outermost end, while the mating or cooperating threaded portion, such for example as the nut portion 1, has straight threads. This allows the nut portion to be run onto the body portion readily by hand up to very nearly its end of travel, where actual clamping of the tubing flare begins, from which point a wrench will be necessary. I have found that by providing one of the mating threads with a straight thread and the other with a thread having a very slight taper, I accomplish desirable coupling in a new and novel manner.

For example, if both of the mating threads were tapered, as in standard pipe threads, there will be a considerable amount of turning wherein it will be necessary to use a wrench and real effort, and it is apparent that should the threads be so matingly cut that the end of the nut portion or the two seats cooperate with a flanged end of the tubing in a manner to actually form a clamping thereof, then the mating threads will not be used to their most efficient manner, for they will not have become tightened together, and only a portion of the thread depth of each will be in engagement. If, moreover, the threads are so cut that they pull tightly together before the seats form in clamping engagement across the flanged end of the tube, then the flanged end may be loosely held between the seats, and inasmuch as the nut portion sleeves the tube comparatively loosely, there will be no holding of pressure between the tubing and the atmosphere.

Likewise it will be seen that if mating straight threads are used, wherein all of the sealing is taken by the seats against the flared end of the tubing, then it is extremely difficult to properly cut such threads, for if they are tight, it will be a tedious, difficult job to thread the threads together, and if they are cut loosely, then the threads are inefficiently mated.

I have therefore evolved a pair of cooperating threaded members wherein the nut portion has a straight thread, while the body portion has a thread tapered very slightly relative thereto, forming a most efficient joint. It is, of course, equally possible to have the body portion straight threaded and the nut portion with threads slightly tapered. It is possible with my construction to have a comparatively loose fit between the threads, as the nut portion enters the body portion, and for a maximum part of its threading travel whereby such threading may be accomplished, readily by hand saving greatly on labor and time the threading together of the pieces. As the nut portion approaches its furthermost travel end of the body portion, the slight taper becomes effective to cause complete engagement of thread depth between the nut portion and the body portion, and at the same time such engagement not being radical enough to prohibit the seats closing in on the flanged end to form a tight, ground-in joint. Furthermore, I find that through the use of the spherical seat as shown in my construction, the slight inward compression of the relatively thinner nut portion as compared to the relatively heavy body portion tends to amplify the grinding of the spherical seat to form more perfect contact between such seat and the flanged end of the tubing.

With such construction no pilot or nose portion is necessary for guidance or to take radial strain between the end of the nut portion when the seats begin to engage the flare, and greater length of thread is available in both the nut and body portions, whereby a greater axial length of threads in engagement is accomplished in the finished coupling.

I find further that the grinding action of the spherical seats tends to form more perfect seats, and at the same time seats which are more readily broken apart, than is the case with flat or conical seats, as has been the practice in the past. With the slightly tapered thread arrangement just described, I am able with a comparatively small percentage of turn to back off or unlock the joint, from which position the nut is readily turned by hand out of the body portion. This differs from those couplings with which I am familiar, having a parallel or convergent or divergent tapered seat, wherein it may be necessary to expend considerable effort and time in breaking the joint and backing off the seats, and wherein if the joint is to be reconnected it may be necessary to use sufficient force in pulling up the portions relative to the flared end whereby one or more of the portions is cracked and spoiled for future use. Such has not been my experience with the invention described herein, for I find that the grinding in of spherical seats as described lends itself to the use over and over of the portions with the same flared end of the tubing, for the reapplication of the portions grinds into the same or a new seat much more efficiently and quickly than would be the case of flat surfaces turning relative to each other.

The method of application of this invention to initiate and complete a coupling operation should be sufficiently clear from the foregoing description; and I desire it to be understood that I have illustrated and described preferred embodiments, but that I am not to be limited thereby other than as claimed in view of prior art.

What I claim as new and desire to secure by Letters Patent of the United States, is:—

In a two-part pipe connection having a body member provided with a threaded mouth and a curved seat adapted to receive the flared end of a pipe, means to hold said pipe on said seat comprising a threaded nut member cooperating with said threaded mouth, having a curved end adapted to clamp the flared end of the pipe against the seat, the thread on one of said members being parallel with the axis thereof throughout its length and of uniform depth, and the thread on the opposed member being of uniform depth but inclined relative to the axis of said first mentioned member throughout its length, whereby the assembling of the two parts to clamp the flared end of the pipe is facilitated.

FREDERICK A. BARNES.